(12) United States Patent
Kim et al.

(10) Patent No.: US 11,124,647 B2
(45) Date of Patent: Sep. 21, 2021

(54) THERMOPLASTIC RESIN COMPOSITION AND MOLDED ARTICLE USING SAME

(71) Applicant: Lotte Advanced Materials Co., Ltd., Yeosu-si (KR)

(72) Inventors: Myunghun Kim, Uiwang-si (KR); Keehae Kwon, Uiwang-si (KR); Jungeun Park, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 34 days.

(21) Appl. No.: 16/456,376

(22) Filed: Jun. 28, 2019

(65) Prior Publication Data

US 2019/0322862 A1  Oct. 24, 2019

Related U.S. Application Data

(63) Continuation-in-part of application No. PCT/KR2017/015690, filed on Dec. 28, 2017.

(30) Foreign Application Priority Data

Dec. 30, 2016 (KR) .................. 10-2016-0184427

(51) Int. Cl.
*C08L 69/00* (2006.01)

(52) U.S. Cl.
CPC ........... *C08L 69/00* (2013.01); *C08L 2201/02* (2013.01); *C08L 2205/035* (2013.01); *C08L 2207/53* (2013.01)

(58) Field of Classification Search
CPC .................................................... C08L 69/00
See application file for complete search history.

(56) References Cited

U.S. PATENT DOCUMENTS

| 9,133,323 | B2 | 9/2015 | Park et al. |
| 9,403,978 | B2 | 8/2016 | Kwon et al. |
| 9,771,476 | B2 | 9/2017 | Kim et al. |
| 2016/0185959 | A1 | 6/2016 | Kim et al. |
| 2016/0312026 | A1 | 10/2016 | Kim et al. |
| 2017/0107373 | A1 | 4/2017 | Matsuyama |

FOREIGN PATENT DOCUMENTS

| EP | 0272425 A2 | 6/1988 |
| EP | 0635547 A2 | 1/1995 |
| JP | 05-070659 | 3/1993 |
| JP | 3384902 A | 7/1996 |
| JP | 2562159 B2 | 12/1996 |
| JP | 3499354 A | 6/1997 |
| JP | 4450336 A | 5/1999 |
| JP | 2002-528589 | 9/2002 |
| JP | 5782547 A | 2/2015 |
| JP | 5950059 | 4/2017 |
| KR | 10-2000-0026020 A | 5/2000 |
| KR | 10-0602045 | 7/2006 |
| KR | 10-0680338 B1 | 2/2007 |
| KR | 10-0700685 B1 | 3/2007 |
| KR | 10-2012-0075053 | 8/2013 |
| KR | 10-2014-0092485 A | 7/2014 |
| KR | 10-2016-0129746 A | 11/2016 |
| KR | 10-2016-0127262 | 11/2017 |
| KR | 10-2016-0081794 | 3/2018 |
| WO | 00/24829 A1 | 5/2000 |
| WO | 2018/124790 A2 | 7/2018 |

OTHER PUBLICATIONS

International Search Report in counterpart International Application No. PCT/KR2017/015690 dated Oct. 11, 2018, pp. 1-3.
Extended Search Report in counterpart European Application No. 17886494.8 dated Jun. 25, 2020, pp. 1-8.

*Primary Examiner* — Arrie L Reuther
(74) *Attorney, Agent, or Firm* — Additon, Pendleton & Witherspoon, P.A.

(57) ABSTRACT

Provided are a thermoplastic resin composition including 100 parts by weight of a base resin including (A-1) a polycarbonate resin, (A-2-1) a first acrylonitrile-butadiene-styrene graft copolymer including a rubber polymer having an average particle diameter of 200 nm to 400 nm and an acrylonitrile-butadiene-styrene copolymer comprising (A-2-2) a second acrylonitrile-butadiene-styrene graft copolymer including a rubber polymer having an average particle diameter of 400 nm to 600 nm, and (A-3) an aromatic vinyl compound-vinyl cyanide compound copolymer; (B) 1 to 10 parts by weight of a crosslinked styrene-acrylonitrile copolymer; and (C) 5 to 15 parts by weight of a flame retardant, and a molded article using the same.

11 Claims, No Drawings

US 11,124,647 B2

THERMOPLASTIC RESIN COMPOSITION AND MOLDED ARTICLE USING SAME

CROSS-REFERENCE TO RELATED APPLICATIONS

This application claims priority to and the benefit of International Application No. PCT/KR2017/015690, filed Dec. 28, 2017, which published as WO 2018/124790 on Jul. 5, 2018; and Korean Patent Application No. 10-2016-0184427, filed in the Korean Intellectual Property Office on Dec. 30, 2016, the entire disclosure of each of which is incorporated herein by reference.

TECHNICAL FIELD

A thermoplastic resin composition and a molded article using the same are disclosed.

BACKGROUND ART

Polycarbonate resin is widely used as one of engineering plastics in a plastic industry.

The polycarbonate resin has a glass transition temperature (Tg) reaching about 150° C. due to a bulky molecular structure such as bisphenol-A and thus shows high heat resistance and also has flexibility and rigidity given by a carbonyl group of a carbonate group having high rotating mobility. In addition, it is an amorphous polymer and thus has excellent transparency characteristics.

However, the polycarbonate resin has a defect of deteriorated flowability and thus, may also be largely used as alloys with various resins in order to complement workability and post processibility.

Of these, a polycarbonate/acrylonitrile-butadiene-styrene copolymer (PC/ABS) alloy has excellent durability, moldability, heat resistance, impact resistance, and the like and may be applied to vast fields such as electricity electronics, an auto, an architecture, miscellaneous real life materials, and the like.

However, when the PC/ABS alloy is used as a vehicle interior, it is necessary to further strengthen impact resistance at room temperature and at a low temperature in consideration of physical damages, and also it is necessary to have a flame retardant property for the safety of passengers in case of a fire.

Accordingly, a method of adding an impact-reinforcing agent in a form of cross-linking a rubber particle such as ABS and methyl methacrylate butadiene-styrene copolymer (MBS) to improve the impact resistance and additionally adding a flame retardant to reinforce reduced flame retardancy has been attempted. However, as an amount of the impact-reinforcing agent increases, too much flame retardancy is required, and the resulting heat resistance may be deteriorated.

In order to solve the above problems, the present invention has been carried out to produce a thermoplastic resin composition capable of obtaining impact resistance, moldability, and flame retardancy simultaneously compared with conventional PC/ABS alloys.

DISCLOSURE

Technical Problem

A thermoplastic resin composition having all excellent impact resistance, moldability, and flame retardancy and a molded article using the same are provided.

Technical Solution

According to an embodiment, provided is a thermoplastic resin composition including 100 parts by weight of a base resin (A-1) a polycarbonate resin, (A-2-1) a first acrylonitrile-butadiene-styrene graft copolymer including a rubber polymer having an average particle diameter of 200 nm to 400 nm and (A-2-2) an acrylonitrile-butadiene-styrene copolymer comprising a second acrylonitrile-butadiene-styrene graft copolymer including a rubber polymer having an average particle diameter of 400 nm to 600 nm, and (A-3) an aromatic vinyl compound-vinyl cyanide compound copolymer resin; (B) 1 to 10 parts by weight of a crosslinked styrene-acrylonitrile copolymer; and (C) 5 to 15 parts by weight of a flame retardant.

The thermoplastic resin composition comprises 55 to 75 wt % of the (A-1) polycarbonate resin, 10 to 15 wt % of the (A-2-1) first acrylonitrile-butadiene-styrene graft copolymer including a rubber polymer having an average particle diameter of 200 nm to 400 nm, 10 to 18 wt % of the (A-2-2) acrylonitrile-butadiene-styrene copolymer comprising the second acrylonitrile-butadiene-styrene graft copolymer including a rubber polymer having an average particle diameter of 400 nm to 600 nm, and 10 wt % or less of the (A-3) aromatic vinyl compound-vinyl cyanide compound copolymer resin based on 100 wt % of the (A) base resin.

Each of the first acrylonitrile-butadiene-styrene graft copolymer and the second acrylonitrile-butadiene-styrene graft copolymer may have a core-shell structure.

The core may consist of butadiene and the shell may consist of a copolymer of acrylonitrile and styrene.

The (A-3) vinyl compound-vinyl cyanide compound copolymer may have a weight average molecular weight of 320,000 g/mol to 420,000 g/mol.

In the (A-3) aromatic vinyl compound-vinyl cyanide compound copolymer, the aromatic vinyl compound may be selected from the group consisting of styrene substituted or unsubstituted with a halogen or a C1 to C10 alkyl group, α-methyl styrene, and a combination thereof.

In the (A-3) aromatic vinyl compound-vinyl cyanide compound copolymer, the vinyl cyanide compound may be selected from acrylonitrile, methacrylonitrile, fumaronitrile, and a combination thereof.

The (A-3) aromatic vinyl compound-vinyl cyanide compound copolymer may be a styrene-acrylonitrile copolymer (SAN).

The (B) crosslinked styrene-acrylonitrile copolymer may have a weight average molecular weight of 3,000,000 g/mol to 7,000,000 g/mol.

The (C) flame retardant may be selected from the group consisting of a phosphate compound, a phosphite compound, a phosphonate compound, polysiloxane, a phosphazene compound, a phosphinate compound, a melamine compound, and a combination thereof.

On the other hand, a molded article using the thermoplastic resin composition according to an embodiment is provided.

Advantageous Effects

A thermoplastic resin composition and a molded article using the same of the present invention has excellent impact resistance, appearance and moldability due to improved impact resistance, extrusion moldability and flame retardancy, and thus, the thermoplastic resin composition and the molded article may be applied to various ranges of products to be used for painting and unpainting, and the thermoplastic resin composition and the molded article may be usefully applied as an interior material for a vehicle, particularly as a vehicle interior finish.

MODE FOR INVENTION

Hereinafter, embodiments of the present invention are described in detail. However, these embodiments are exemplary, the present invention is not limited thereto and the present invention is defined by the scope of claims.

In the present specification, when a definition is not otherwise provided, "substituted" refers to replacement of at least one hydrogen of a compound by a C1 to C30 alkyl group; a C1 to C10 alkylsilyl group; a C3 to C30 cycloalkyl group; a C6 to C30 aryl group; a C2 to C30 heteroaryl group; a C1 to C10 alkoxy group; a fluoro group, a C1 to C10 trifluoroalkyl group such as a trifluoromethyl group; or a cyano group.

In the present specification, when a definition is not otherwise provided, "hetero" may refer to one including 1 to 3 heteroatoms selected from the group consisting of N, O, S, and P, and remaining carbons in a compound or a substituent.

In the present specification, when a definition is not otherwise provided, "alkyl group" may refer to a "saturated alkyl group" without an alkene group or an alkyne group; or an "unsaturated alkyl group" including at least one of an alkene group and an alkyne group. The "alkene group" may refer to a substituent in which at least two carbon atoms are bound with at least one carbon-carbon double bond, and the "alkynyl group" refers to a substituent in which at least two carbon atoms are bound with at least one carbon-carbon triple bond. The alkyl group may be a branched, linear, or cyclic alkyl group.

The alkyl group may be a C1 to C20 alkyl group, specifically a C1 to C6 lower alkyl group, a C7 to C10 middle alkyl group, or a C11 to C20 higher alkyl group.

"Aromatic" may refer to a compound including a cyclic structure where all elements have p-orbitals which form conjugation. Specific examples thereof may be aryl group and a heteroaryl group.

The "aryl group" may refer to a monocyclic or fused ring-containing polycyclic (i.e., rings sharing adjacent pairs of carbon atoms) groups.

The "heteroaryl group" may refer to one including 1 to 3 heteroatoms selected from the group consisting of N, O, S, or P in aryl group, and remaining carbons. When the heteroaryl group is a fused ring, each ring may include 1 to 3 heteroatoms.

In the present specification, when specific definition is not otherwise provided, (meth)acrylate refers to acrylate or methacrylate. In addition, a (meth)acrylic acid alkyl ester refers to an acrylic acid alkyl ester or a methacrylic acid alkyl ester and a (meth)acrylic acid ester refers to an acrylic acid ester or a methacrylic acid ester.

In the present specification, when a definition is not otherwise provided, "copolymerization" may refer to block copolymerization, random copolymerization, graft copolymerization, or alternate copolymerization and "copolymer" may refer to a block copolymer, a random copolymer, a graft copolymer, or an alternate copolymer.

According to an embodiment, a thermoplastic resin composition including 100 parts by weight of a base resin including (A-1) a polycarbonate resin and (A-2) a acrylonitrile-butadiene-styrene graft copolymer including (A-2-1) a first acrylonitrile-butadiene-styrene graft copolymer including a rubber polymer having an average particle diameter of 200 nm to 400 nm and (A-2-2) a second acrylonitrile-butadiene-styrene graft copolymer including a rubber polymer having an average particle diameter of 400 nm to 600 nm, and (A-3) an aromatic vinyl compound-vinyl cyanide compound copolymer; (B) 1 to 10 parts by weight of a crosslinked styrene-acrylonitrile copolymer; and (C) 5 to 15 parts by weight of a flame retardant.

Hereinafter, each component included in the thermoplastic resin composition will be described in detail.

(A) Base Resin (A-1) Polycarbonate Resin

The polycarbonate resin is a polyester having a carbonate bond, is not particularly limited, and may be any polycarbonate that is usable in a field of resin composition.

For example, the polycarbonate resin may be prepared by reacting diphenols represented by Chemical Formula 1 with phosgene, halogenic acid ester, carbonate ester, or a combination thereof.

[Chemical Formula 1]

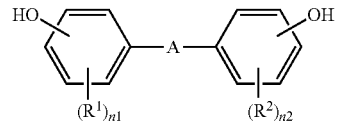

In Chemical Formula 1,

A is a linking group selected from the group consisting of a single bond, a substituted or unsubstituted C1 to C30 alkylene group, a substituted or unsubstituted C2 to C5 alkenylene group, a substituted or unsubstituted C2 to C5 alkylidene group, a substituted or unsubstituted C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted C1 to C20 alkoxylene group, a halogenic acid ester group, a carbonate ester group, CO, S, and $SO_2$, $R^1$ and $R^2$ are independently a substituted or unsubstituted C1 to C30 alkyl group or a substituted or unsubstituted C6 to C30 aryl group, and n1 and n2 are independently an integer ranging from 0 to 4.

Two or more types of the diphenols represented by Chemical Formula 1 may be combined to constitute a repeating unit of a polycarbonate resin.

Specific examples of the diphenols may be hydroquinone, resorcinol, 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Among the diphenols, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, or 1,1-bis(4-hydroxyphenyl)cyclohexane may be desirably used. 2,2-bis(4-hydroxyphenyl)propane may be more desirably used.

The polycarbonate resin may be a mixture of copolymers obtained using two or more types of dipenols that differ from each other.

In addition, the polycarbonate resin may be a linear polycarbonate resin, a branched polycarbonate resin, a polyester carbonate copolymer resin, and the like.

Specific examples of the linear polycarbonate resin may be a bisphenol-A polycarbonate resin. Specific examples of the branched polycarbonate resin may be a polymer prepared by reacting a multi-functional aromatic compound such as trimellitic anhydride, trimellitic acid, and the like with diphenols and a carbonate. The polyester carbonate copolymer resin may be prepared by reacting bifunctional carboxylic acid with diphenols and carbonate, wherein the used carbonate is diaryl carbonate such as diphenyl carbonate or ethylene carbonate.

The polycarbonate resin may have a weight average molecular weight of 10,000 g/mol to 200,000 g/mol, for example, 14,000 g/mol to 40,000 g/mol. When the weight average molecular weight of the polycarbonate resin has within the ranges, excellent impact resistance and flowability may be obtained. In addition, two different types of the polycarbonate resin having a different weight average molecular weight or a different flow index may be mixed and used in order to satisfy desirable flowability.

The polycarbonate resin may be for example included in an amount of 50 wt % to 90 wt %, for example 55 wt % to 85 wt %, for example 55 wt % to 80 wt %, for example 55 wt % to 75 wt %, for example 60 wt % to 75 wt %, for example 60 wt % to 72 wt %, for example 60 wt % to 70 wt % based on 100 wt % of the base resin. When the polycarbonate resin is used in an amount of less than 50 wt %, appearance characteristics are not sufficient, while when the polycarbonate resin is used in an amount of greater than 90 wt %, mechanical strength may be deteriorated.

(A-2-1, A-2-2) Acrylonitrile-Butadiene-Styrene Graft Copolymer, and Acrylonitrile-Butadiene-Styrene Copolymer Comprising Acrylonitrile-Butadiene-Styrene Graft Copolymer The acrylonitrile-butadiene-styrene graft copolymer may have a core-shell structure composed of a core formed of a butadiene-based rubbery polymer component and a shell formed by a graft polymerization reaction of acrylonitrile and styrene around the core.

A rubbery polymer component of the core improves impact strength at a particularly low temperature and the shell component is disposed at the interface of a continuous phase, for example an aromatic vinyl compound-vinyl cyanide compound copolymer and a rubbery polymer to make a size of a rubbery polymer particle in a dispersion phase be smaller and to improve adherence in the interface.

The acrylonitrile-butadiene-styrene graft copolymer may include a first acrylonitrile-butadiene-styrene graft copolymer (A-2-1) and a second acrylonitrile-butadiene-styrene graft copolymer which include a rubbery polymer having a different average particle diameter.

In addition, for a particle diameter of a particle in the present invention, although it may be numerized by a measurement to show an average size of a group, the generally used method includes a mode diameter showing the maximum value of the distribution, a median diameter corresponding to the center value of integral distribution curve, a variety of average diameters (numeral average, length average, area average, mass average, volume average, etc.), and the like. Unless particularly mentioning otherwise, an average particle diameter means to a volume average diameter in the present disclosure, and it is obtained by measuring Z-average particle size measured using a dynamic light scattering particle size analyzer.

The acrylonitrile-butadiene-styrene graft copolymer may be prepared by adding styrene and acrylonitrile to a butadiene-based rubbery polymer and graft-copolymerizing them via conventional polymerization methods such as emulsion polymerization and bulk polymerization.

The first acrylonitrile-butadiene-styrene graft copolymer (A-2-1) may include the rubbery polymer having an average particle diameter of for example 200 nm to 400 nm, for example 200 nm to 350 nm, for example 250 nm to 350 nm.

The first acrylonitrile-butadiene-styrene graft copolymer (A-2-1) may be for example included in an amount of 10 wt % to 15 wt %, for example 11 wt % to 13 wt % based on 100 wt % of the base resin.

10 wt % to 60 wt % of the butadiene-based rubbery polymer, 20 wt % to 80 wt % of the styrene, and 5 wt % to 45 wt % of the acrylonitrile may be included based on 100 wt % of the first acrylonitrile-butadiene-styrene graft copolymer (A-2-1).

When the first acrylonitrile-butadiene-styrene graft copolymer (A-2-1) is included in an amount less than 10 wt % based on 100 wt % of the base resin, impact resistance and extrusion moldability of the thermoplastic resin composition may be deteriorated while when it is greater than 15 wt %, heat resistance and flame retardancy of the thermoplastic resin composition may be deteriorated.

The second acrylonitrile-butadiene-styrene graft copolymer may include the rubbery polymer having an average particle diameter of for example 350 nm to 650 nm, for example 400 nm to 600 nm, for example 450 nm to 550 nm.

10 wt % to 60 wt % of the butadiene-based rubbery polymer, 20 wt % to 80 wt % of the styrene, and 5 wt % to 45 wt % of the acrylonitrile may be included based on 100 wt % of the second acrylonitrile-butadiene-styrene graft copolymer based on 100 wt % of the base resin.

The second acrylonitrile-butadiene-styrene graft copolymer may be included in an amount of for example 10 wt % to 18 wt %, for example 10 wt % to 15 wt %, for example 11 wt % to 13 wt % based on 100 wt % of the base resin.

When the second acrylonitrile-butadiene-styrene graft copolymer is included in an amount of less than 10 wt % based on the base resin, impact resistance and extrusion moldability of the thermoplastic resin composition may be deteriorated, while when it is greater than 18 wt %, heat resistance and flame retardancy of the thermoplastic resin composition may be deteriorated.

The acrylonitrile-butadiene-styrene copolymer (A-2-2) which comprises the second acrylonitrile-butadiene-styrene graft copolymer may be obtained by copolymerizing the second acrylonitrile-butadiene-styrene graft copolymer and an acrylonitrile-styrene copolymer, followed by melt-kneading, or by bulk polymerization by adding styrene and acrylonitrile to a butadiene-based rubbery polymer.

Based on 100 wt % of the acrylonitrile-butadiene-styrene copolymer (A-2-2), the second acrylonitrile-butadiene-styrene graft copolymer may be included in an amount of 15 wt % to 65 wt % and acrylonitrile-styrene copolymer may be included in an amount of 35 wt % to 85 wt %.

The acrylonitrile-butadiene-styrene copolymer (A-2-2) may include 10 wt % to 25 wt % of the butadiene rubbery polymer based on 100 wt % of the acrylonitrile-butadiene-styrene copolymer (A-2-2).

(A-3) Aromatic Vinyl Compound-Vinyl Cyanide Compound Copolymer Resin

The aromatic vinyl compound-vinyl cyanide compound copolymer is formed by copolymerizing a vinyl cyanide compound and an aromatic vinyl compound.

The vinyl cyanide compound may be selected from the group consisting of acrylonitrile, methacrylonitrile, fumaronitrile, and a combination thereof.

The aromatic vinyl compound may be selected from the group consisting of styrene substituted or unsubstituted with a halogen or a C1 to C10 alkyl group, α-methyl styrene, and a combination thereof.

The vinyl cyanide compound-aromatic vinyl compound copolymer may be a styrene-acrylonitrile copolymer (SAN).

A thermoplastic resin composition according to an embodiment may include may include 50 to 90 wt % by weight of the aromatic vinyl compound and 10 to 50 wt % by weight of the vinyl cyanide compound based on 100 wt % by weight of the aromatic vinyl compound-vinyl cyanide compound copolymer resin.

The aromatic vinyl compound-vinyl cyanide compound copolymer resin may have a weight average molecular weight of 320,000 g/mol to 420,000 g/mol for example 320,000 g/mol to 380,000 g/mol.

During preparation of the thermoplastic resin composition, the aromatic vinyl compound-vinyl cyanide compound copolymer resin may be included in an amount of greater than 0 wt % and less than or equal to 15 wt %, for example greater than 0 wt % and less than or equal to 14 wt %, for example greater than 0 wt % and less than or equal to 13 wt %, for example greater than 0 wt % and less than or equal to 12 wt %, for example greater than 0 wt % and less than or equal to 11 wt %, for example greater than 0 wt % and less than or equal to 10 wt %, for example greater than 0 wt % and less than or equal to 9 wt % based on 100 wt % of the base resin.

When the amount of the aromatic vinyl compound-vinyl cyanide compound is out of the range, compatibility between the polycarbonate resin and the acrylonitrile-butadiene-styrene graft copolymer may be deteriorated and thus impact resistance and extrusion moldability of the thermoplastic resin composition may be deteriorated.

(B) Crosslinked Styrene-Acrylonitrile Copolymer

The crosslinked styrene-acrylonitrile copolymer may be a material with a super-polymeric content by cross-linking the styrene-acrylonitrile copolymer. The crosslinked styrene-acrylonitrile copolymer may improve compatibility between the polycarbonate resin and the acrylonitrile-butadiene-styrene graft copolymer. As a result, a thermoplastic resin having enhanced extrusion moldability may be provided.

The crosslinked styrene-acrylonitrile copolymer may have for example a weight average molecular weight of 3,000,000 g/mol to 7,000,000 g/mol, for example 4,000,000 g/mol to 6,000,000 g/mol.

When the weight average molecular weight of the crosslinked styrene-acrylonitrile copolymer is out of the ranges, compatibility between the polycarbonate resin and the acrylonitrile-butadiene-styrene graft copolymer may be deteriorated and thus extrusion moldability may be deteriorated.

The crosslinked styrene-acrylonitrile copolymer may be for example included in an amount of greater than or equal to 1 part by weight and less than or equal to 10 parts by weight, for example 1 part by weight to 8 parts by weight, for example 1 part by weight to 5 parts by weight based on 100 parts by weight of the base resin.

When an amount of the crosslinked styrene-acrylonitrile copolymer is within the ranges, compatibility between the polycarbonate resin and the acrylonitrile-butadiene-styrene graft copolymer may be improved, and thus the extrusion moldability of the thermoplastic resin may be improved by an embodiment.

(C) Flame Retardant

The flame retardant is a material that reduces flammability and an example of the flame retardant is a phosphate flame retardant, such as at least one of a phosphate compound, a phosphite compound, a phosphonate compound, polysiloxane, a phosphazene compound, phosphinate compound, or the melamine compounds.

These phosphorus flame retardants exhibit excellent flame retardancy effects in the solid phase reaction and are effective for thermoplastic resin including a large amount of oxygen.

Examples of flame retardants include monomeric phosphorus compounds such as triphenyl phosphate, resorcinol bisphenol phosphate, and the like, polymeric flame retardants such as polyphosphonates, and the like, and a combination thereof. When monomeric phosphorus flame retardants are used, flame retardancy may be conveniently secured while when polymer-type polyphosphonate flame retardants are used, excellent flame retardancy and mechanical properties may be secured, and they are not volatilized during molding and exhibit high compatibility with the base resin.

However, the present invention is not limited thereto and depending on the amount of the base resin and the specific use of the thermoplastic resin, at least one of a flame retardant, a halogen flame retardant, an inorganic flame retardant, or a polymer flame retardant may be further used in addition to the phosphorus flame retardant.

The flame retardant may be for example included in an amount of 5 parts by weight to 15 parts by weight, for example 7 parts by weight to 12 parts by weight based on 100 parts by weight of the base resin.

When the amount of the flame retardant is within the ranges, it may meet heat resistance required for the thermoplastic resin composition, for example about 85° C. heat resistance (based on HDT), and may reinforce flame retardancy of thermoplastic resin composition while minimizing deterioration of other properties.

(D) Other Additives

The thermoplastic resin composition may further include additives optionally in accordance with its use. The additives may include lubricants, plasticizers, heat stabilizers, antioxidants, light stabilizers, or colorants, and two or more types may be mixed in accordance with characteristics of final molded products.

The lubricants play a role of smoothening the surface of a metal contacting with the thermoplastic resin composition during the process/molding/extrusion and thus helping a flow or movement of the resin composition.

The plasticizers may be generally used to increase flexibility, process workability, or expansion property of the thermoplastic resin composition and may be any generally-used materials.

The heat stabilizers may suppress a thermal decomposition of the thermoplastic resin composition when kneaded or molded at a high temperature and may be any generally-used materials.

The antioxidants may suppress or block a chemical reaction of the thermoplastic resin composition with oxygen and thus prevent decomposition of the resin composition and loss of its inherent properties and include at least one of phenol-type, phosphate-type, thioether-type, or amine-type antioxidants, but is not limited thereto.

The light stabilizers suppresses or blocks decomposition of the thermoplastic resin composition from ultraviolet (UV) and thus its color change or mechanical property loss and specifically, may include at least one of hindered phenol type, benzophenone type, or benzotriazole type light stabilizers, but is not limited thereto.

The colorant may include a general pigment or dye.

The additives may be included in an amount of 1 part by weight to 15 parts by weight based on 100 parts by weight of the thermoplastic resin composition.

The thermoplastic resin composition according to the present invention may be prepared in a well-known method of preparing a resin composition.

For example, the thermoplastic resin composition according to the present invention may be manufactured into a pellet by mixing components and other additives simultaneously and melt-extruding the same in an extruder.

A molded product according to an example embodiment of the present invention may be manufactured from the thermoplastic resin composition. The thermoplastic resin composition may be applied to any molded article requiring resistance to chemicals due to improved chemical resistance, flame retardancy, heat resistance, impact resistance, and moldability and may be specifically used as an interior material for automobiles.

Hereinafter, the present invention is illustrated in more detail with reference to examples and comparative examples. However, the following examples and comparative examples are provided for the purpose of descriptions and the present invention is not limited thereto.

Hereinafter, the present invention is illustrated in more detail with reference to examples. These examples, however, are not in any sense to be interpreted as limiting the scope of the invention.

Example 1 to Example 3 and Comparative Example 1 to Comparative Example 5

The thermoplastic resin compositions according to examples and comparative examples were prepared according to the component amount ratios described in Table 1.

In Table 1, the components of the base resin are expressed as wt % by reference to the total weight of the base resin, and the crosslinked styrene-acrylonitrile copolymer and the phosphorus flame retardant added as additives to the base resin are expressed in parts by weight units for 100 parts by weight of the base resin.

The components shown in Table 1 were dry-mixed, consecutively dispensed quantitively in a feed section of a twin-screw extruder (L/D=29, φ=45 mm), and melted/kneaded. Subsequently, a thermoplastic resin composition prepared into a pellet through the twin-screw extruder was dried at about 80° C. for about 2 hours, and the pellet was injection-molded into specimens for measuring properties, and specimens for evaluating high temperature tensile strength and elongation rate (thickness of 3 mm, width of 3 mm, and length of 300 mm) through a 6 Oz injection molding machine by setting a cylinder temperature at about 250° C. and a mold temperature at about 60° C.

TABLE 1

|  | Unit | Ex. 1 | Ex. 2 | Ex. 3 | Comp. Ex. 1 | Comp. Ex. 2 | Comp. Ex. | Comp. Ex. 4 | Comp. Ex. 5 |
|---|---|---|---|---|---|---|---|---|---|
| (A-1-1) | wt % | 36 | 36 | 66 | 36 | 66 | 66 | 66 | — |
| (A-1-2) |  | 30 | 35 | — | 30 | — | — | — | 66 |
| (A-2-1) |  | 12.5 | 12.5 | 12.5 | 15 | 15 | 17.5 | 23 | 12.5 |
| (A-2-2) |  | 16.5 | 16.5 | 16.5 | 19 | 19 | 9.5 | — | 16.5 |
| (A-3) |  | 5 | — | 5 | — | — | 7 | 11 | 5 |
| (B) | parts | 2 | 2 | 2 | 2 | 2 | 2 | 2 | 2 |
| (C) | by weight | 10 | 10 | 10 | 10 | 10 | 10 | 10 | 10 |

The description of each component shown in Table 1 is as follows.

(A) Base Resin (A-1) Polycarbonate Resin (A-1-1) First Polycarbonate Resin

Polycarbonate resin having a weight average molecular weight of about 35,000 g/mol (Samyang Corporation)

(A-1-2) Second Polycarbonate Resin

Polycarbonate resin having a weight average molecular weight of about 27,000 g/mol (Lotte Advanced Materials Co., Ltd.)

(A-2-1) First Acrylonitrile-Butadiene-Styrene Graft Copolymer

Acrylonitrile-butadiene-styrene graft copolymer including 45 wt % of a butadiene core having an average particle diameter of 300 nm (Lotte Advanced Materials Co., Ltd.).

(A-2-2) Second Acrylonitrile-Butadiene-Styrene Copolymer

Acrylonitrile-butadiene-styrene copolymer resin which comprises acrylonitrile-butadiene-styrene copolymer resin including 12 wt % of a butadiene core having an average particle diameter of 500 nm (Sinopec Corp.).

(A-3) Aromatic Vinyl Compound-Vinyl Cyanide Compound Copolymer Resin

SAN resin including 29 wt % of acrylonitrile and 71 wt % of styrene and having a weight average molecular weight of about 360,000 g/mol (Lotte Advanced Materials Co., Ltd.)

(B) Crosslinked Styrene-Acrylonitrile Copolymer

Cross-linked Styrene-Acrylonitrile Copolymer having a weight average molecular weight of about 5,000,000 g/mol (ZIBO HUAXING ADDITIVES Co., Ltd.)

(C) Phosphorus Flame Retardant

Phosphate compound flame retardant (DAIHACHI Co., Ltd., CR-741) Experimental Example The experimental results are shown in Table 2.

(1) Flowability (g/10 min): The melt flow index (MFI) was measured according to ISO 1133 at 250° C., under a 10 kg condition.

(2) heat resistance (° C.): Thermal distortion temperature (HDT) was measured according to ISO 75-2Af under a 1.8 MPa load condition.

(3) Impact resistance (kg·cm/cm): Notched Izod Impact strength was measured according to ISO 180-1A at room temperature and −40° C., respectively.

(4) moldability (kgf/cm²): The specimens for evaluating elongation rates was elongated by using a universal tester (INSTRON) at 150° C. at a speed of 254 mm/min such that high temperature tensile strength and elongation rate were measured.

(5) Flame retardancy (sec): Combustion time was measured according to UL94 HB condition.

TABLE 2

|  | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| MFI | 27 | 26 | 22 | 25 | 20 | 19 | 21 | 33 |
| HDT | 85 | 87 | 87 | 84 | 82 | 83 | 82 | 82 |
| IZOD Impact strength (23° C.) | 60 | 61 | 65 | 58 | 61 | 58 | 50 | 54 |
| IZOD Impact strength (−40° C.) | 40 | 41 | 45 | 40 | 43 | 36 | 23 | 23 |
| High temperature tensile strength (150° C.) | 11.6 | 10.6 | 13 | 11.8 | 12.4 | 12.5 | 12.3 | 8.9 |
| High temperature elongation rate (150° C.) | 642 | 683 | 650 | 610 | 606 | 593 | 560 | 630 |
| Combustion time | 63 | 56 | 62 | 96 | 97 | 99 | 128 | 69 |

From Tables 1 and 2, By using the constituents according to the present invention in the optimum amounts as in Examples 1 to 3, thus the thermoplastic resin composition may realize flame retardancy while securing excellent impact resistance, moldability and heat resistance.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. A thermoplastic resin composition, comprising
100 parts by weight of a base resin comprising
(A-1) a polycarbonate resin,
(A-2-1) a first acrylonitrile-butadiene-styrene graft copolymer including a rubber polymer having an average particle diameter of 200 nm to 400 nm and
(A-2-2) an acrylonitrile-butadiene-styrene copolymer comprising a second acrylonitrile-butadiene-styrene graft copolymer including a butadiene rubbery polymer having an average particle diameter of 400 nm to 600 nm, wherein the (A-2-2) acrylonitrile-butadiene-styrene copolymer comprises 10 wt % to 25 wt % of the butadiene rubbery polymer based on 100 wt % of the (A-2-2) acrylonitrile-butadiene-styrene copolymer, and
(A-3) an aromatic vinyl compound-vinyl cyanide compound copolymer resin;
(B) 1 to 10 parts by weight of a crosslinked styrene-acrylonitrile copolymer; and
(C) 5 to 15 parts by weight of a flame retardant.

2. The thermoplastic resin composition of claim 1, comprising:
55 to 75 wt % of the (A-1) polycarbonate resin,
10 to 15 wt % of the (A-2-1) first acrylonitrile-butadiene-styrene graft copolymer including a rubber polymer having an average particle diameter of 200 nm to 400 nm,
10 to 18 wt % of the (A-2-2) acrylonitrile-butadiene-styrene copolymer comprising the second acrylonitrile-butadiene-styrene graft copolymer including a butadiene rubber polymer having an average particle diameter of 400 nm to 600 nm, and
10 wt % or less of the (A-3) aromatic vinyl compound-vinyl cyanide compound copolymer resin
based on 100 wt % of the (A) base resin.

3. The thermoplastic resin composition of claim 1, wherein each of the first acrylonitrile-butadiene-styrene graft copolymer and the second acrylonitrile-butadiene-styrene graft copolymer have a core-shell structure.

4. The thermoplastic resin composition of claim 3, wherein the core consists of butadiene and the shell consists of a copolymer of acrylonitrile and styrene.

5. The thermoplastic resin composition of claim 1, wherein
the (A-3) aromatic vinyl compound-vinyl cyanide compound copolymer has a weight average molecular weight of 320,000 g/mol to 420,000 g/mol.

6. The thermoplastic resin composition of claim 1, wherein
in the (A-3) aromatic vinyl compound-vinyl cyanide compound copolymer,
the aromatic vinyl compound is selected from the group consisting of styrene, styrene substituted with a halogen, styrene substituted with a C1 to C10 alkyl group, α-methyl styrene, and combinations thereof.

7. The thermoplastic resin composition of claim 1, wherein
in the (A-3) aromatic vinyl compound-vinyl cyanide compound copolymer,
the vinyl cyanide compound is selected from the group consisting of acrylonitrile, methacrylonitrile, fumaronitrile, and combinations thereof.

8. The thermoplastic resin composition of claim 1, wherein the (A-3) aromatic vinyl compound-vinyl cyanide compound copolymer is a styrene-acrylonitrile copolymer (SAN).

9. The thermoplastic resin composition of claim 1, wherein the (B) crosslinked styrene-acrylonitrile copolymer has a weight average molecular weight of 3,000,000 g/mol to 7,000,000 g/mol.

10. The thermoplastic resin composition of claim 1, wherein the (C) flame retardant is selected from the group consisting of phosphate compounds, phosphite compounds, phosphonate compounds, polysiloxanes, phosphazene compounds, phosphinate compounds, melamine compounds, and combinations thereof.

11. A molded article using the thermoplastic resin composition of claim 1.

* * * * *